United States Patent [19]

Barcroft et al.

[11] Patent Number: 5,489,619
[45] Date of Patent: Feb. 6, 1996

[54] PROCESS FOR PRODUCING IMPROVED PHENOLIC FOAMS FROM PHENOLIC RESOLE RESINS

[75] Inventors: Michael A. Barcroft, South Glamorgan, Wales; Kathryn S. Gould, Bedfordshire, England; David R. Johnstone; David C. Wilson, both of South Glamorgan, Wales

[73] Assignee: BP Chemicals Limited, London, England

[21] Appl. No.: 212,302

[22] Filed: Mar. 14, 1994

Related U.S. Application Data

[63] Continuation of Ser. No. 752,631, Aug. 27, 1991, abandoned.

[51] Int. Cl.⁶ .............................. C08J 9/06; C08K 5/02
[52] U.S. Cl. ................... 521/131; 528/86; 252/182.2; 252/182.24; 252/182.27
[58] Field of Search ............................ 521/131; 528/86; 252/182.2, 182.24, 182.27

[56] References Cited

U.S. PATENT DOCUMENTS

| | | | |
|---|---|---|---|
| 4,057,974 | 11/1977 | Murphy et al. | 252/364 X |
| 4,560,829 | 12/1985 | Reed et al. | 264/DIG. 5 |
| 4,972,002 | 11/1990 | Volkert | 521/120 OR |
| 4,997,706 | 3/1991 | Smits et al. | 428/304 |
| 5,084,190 | 1/1992 | Fernandez | 252/3 X |
| 5,141,654 | 8/1992 | Fernandez | 252/3 X |
| 5,182,040 | 1/1993 | Bartlett et al. | 252/364 X |

FOREIGN PATENT DOCUMENTS

| | | |
|---|---|---|
| 1442858 | 7/1976 | United Kingdom . |
| 1551370 | 8/1979 | United Kingdom . |
| 2143237 | 2/1985 | United Kingdom . |

OTHER PUBLICATIONS

Derwent Abstract, Accession No. 89–112335 [15] (corresponding to JP1060694-A 890307).

Primary Examiner—James J. Seidleck
Assistant Examiner—Duc Truong
Attorney, Agent, or Firm—Brooks Haidt Haffner & Delahunty

[57] ABSTRACT

This invention relates to novel blowing agents comprising a blend of (A) perfluoro- or partially fluorinated-(cyclo)alkanes and (B) one or more of hydrogenated chlorofluorocarbons, hydrogenated fluorocarbons and a low boiling (cyclo)alkane. These blowing agents perform as well as the conventionally used CFC's but are user friendly and do not have the adverse effect of depletion of the ozone layer. These blowing agents are particularly suited for use in producing foams from synthetic polymers and resins, especially phenolic foams of very low and stable thermal conductivity.

9 Claims, No Drawings

PROCESS FOR PRODUCING IMPROVED PHENOLIC FOAMS FROM PHENOLIC RESOLE RESINS

This application is a continuation of application Ser. No. 07/752,631, filed Aug. 27, 1991, now abandoned.

The present invention relates to blowing agents for producing foams from synthetic polymers or resins and in particular for producing foams from phenolic resins, polystyrene and polyurethane resins.

Hitherto chlorofluorocarbons (hereafter "CFC's") have been widely used as blowing agents for producing foams from synthetic resins. Whilst the CFC's perform very efficiently as blowing agents, it has been increasingly causing concern that these agents may have a damaging effect on the environment, especially the depletion of the ozone layer. Thus there have been great efforts made to identify a substitute for CFC's which will be more user friendly. Such efforts have met with some success using CFC's in which one or more of the chlorine atoms has been replaced by hydrogen atoms (hereafter "HCFC's"). Whilst the HCFC's are far more environmentally safe than the CFC's, they nevertheless do not lead to foam of as good physical properties. Most especially, the thermal insulation performance is impaired and physical strength reduced. In phenolic foams, an effective blowing agent must meet the following criteria:

(a) It must be not readily soluble in the resin to be foamed;
(b) It should be easy to emulsify in the resin; and
(c) For a surfactant to be effective it must reside at the interface between blowing agent and resin. For this to happen, the surfactant must have a balanced affinity for the two phases.

These criteria are not met by HCFC's alone because HCFC's, for instance, are more soluble in phenolic resins than CFC's (see Examples below) and the conventional surfactants produce foam of coarse, friable cell structure. Hence the relatively poor performance of HCFC's as blowing agents when compared with CFC's. Similarly perfluoroalkanes when used alone give a poor performance as the blowing agent.

It has now been found that the above performance problems can be mitigated by using a blend of materials which have either no ozone depletion potential or very little since they are either free of chlorine or have short atmospheric lifetimes compared to CFC's.

It is an object of the present invention to devise a process for producing phenolic foams of improved properties, for example, one or more of water absorption, moisture vapour transmission, stable thermal conductivity values, compression strength and closed cell content such that it has a thermal conductivity value (k) below 0.025 W/m.K by using a novel blowing agent for making said foams. The thermal conductivity value of a given foam is represented by 'k' and can be measured at 10° C. according to BS 4370, Part 2. The thermal conductivity value will hereafter be referred to as the "k value". The lower the k value the lower the thermal conductivity and the more desirable the foam.

Accordingly, the present invention is a blowing agent for producing foams from synthetic polymers or resins said agent comprising a blend of
(A) at least one fluorocarbon (hereafter "PFA") of the general formula:

$$C_nH_xF_y \qquad \text{(I)}$$

wherein x=0, or a whole number from 2 to n/2 such that
(a) for a cyclic fluorocarbon
when x=0, n=3 to 10 and y=2n and
when x=a whole number from 2 to n/2,
n=4 or higher and
y=2n−x
whereby x+y=2n, and
(b) for an open chain fluorocarbon
when x=0, n=2 to 10 and y=2n+2
when x=a whole number from 2 to n/2,
n=4 or higher and
y=(2n+2)−x (B) at least one other component selected from
(a) a hydrogenated chlorofluorocarbon (hereafter "HCFC"),
(b) a hydrogenated fluorocarbon (hereafter "HFC") of the general formula:

$$C_rH_pF_q \qquad \text{(II)}$$

wherein
r=1 to 3
p=1 to 4 and
q=(2r+2)−p for an open-chain HFC
and (2r−p) for a cyclic HFC
such that
p+q=2r+2 for an open chain HFC and 2r for a cyclic HFC, and (c) an alkane or cycloalkane having a boiling point below 120° C.

In the blowing agent, PFA's forming component (A) may be selected from perfluoro(cyclo)alkanes, especially the $C_3$-$C_8$ perfluoro(cyclo)alkanes in which all hydrogen atoms in the (cyclo)alkane have been replaced by fluorine atoms, and partially fluorinated $C_4$ and higher (cyclo)alkanes in which the number of hydrogen atoms is not greater than half the number of carbon atoms in the fluoro(cyclo)alkane as represented by formula (I). Specific examples of partially fluorinated (cyclo)alkanes preferably include the fluorinated $C_4$-$C_8$ (cyclo)alkanes in which the number of hydrogen atoms is two or less for the $C_4$ (cyclo)alkanes and correspondingly four or less for the $C_8$ (cyclo)alkanes. These PFA's can be used singly or as a mixture of two or more PFA's. Perfluoropentane, perfluorohexane and perfluoroheptane are particularly preferred.

In the blowing agent, HCFC's forming component (B)(a) include those hydrogenated chlorofluorocarbons well known to those skilled in the art. In particular, one or more of the following can suitably be used:

| | |
|---|---|
| HCFC 123 which can be represented by | $CF_3\text{—}CHCl_2$ |
| HCFC 141b | $CCl_2F\text{—}CH_3$ |
| HCFC 124 | $CHClF_2$ |
| HCFC 142b | $CH_3CClF_2$ |
| FORMACEL S (Regd. Trade Mark) | $CHClF_2$ |
| HCFC 225ca | $CHCl_2\text{—}CF_2\text{—}CF_3$ |
| HCFC 225cb | $CClF_2\text{—}CF_2\text{—}CHClF$ |

In the blowing agent the HFC's forming component (B)(b) include those hydrogenated fluorocarbons which have less than 4 carbon atoms. In particular, one or more of the following can be suitably used:

| | |
|---|---|
| HFC 125 which can be represented by | $CHF_2\text{—}CF_3$ |

| | |
|---|---|
| HFC 134a | $CF_3$—$CH_2F$ |
| HFC 152a | $CH_3$—$CHF_2$ |

Component (B)(c) is preferably a-pentane, e.g. n-pentane or cyclopentane.

According to a further embodiment, the present invention is a process for producing phenolic foams from phenolic resins using the aforementioned blowing agents of the present invention.

According to yet another embodiment, the present invention is a process for producing low-k phenolic foams having a k-value of below 0.025 W/m.K from phenolic resins using the blowing agents of the present invention.

The relative amounts of the Components (A) and (B) in the blowing agents used will depend upon the particular component (A) and Component (B) used, the type of resin to be foamed e.g. phenolic or polyurethane, the type of foam desired e.g. rigid foams made from these polymers are particularly valuable for thermal insulation, and the degree of foaming desired. In addition, it will also depend upon the nature of the surfactant used as cell stabiliser. As a general guide good foams, especially phenolic foams, can be obtained using as low as 0.5% w/w or as high as 70% w/w of the PFA in the blend but is preferably in the range from 5–60% w/w of the blend.

The surfactants or cell stabilisers that may be used in producing the foams of the present invention may be any of those conventionally used. For instance these may be silicones or ether alkoxylates, especially the alkoxylates of castor oil. Castor oil is a glyceride in which the glycerol is esterified predominantly with ricinoleic acid. The cell stabilizer is prepared from castor oil as such or from a hydrogenated derivative thereof. The hydrogenated derivative may be either fully or partially hydrogenated with respect to the unsaturation in the ricinoleic acid moiety in castor oil. Thus, castor oil or its hydrogenated derivative can be alkoxylated e.g. with ethylene oxide or mixtures thereof with propylene oxide and/or butylene oxide. The alkoxylated castor oil derivative contains suitably from 40–80 ethylene oxide units per mole of castor oil.

The hardener or curing agent may be any of the conventional hardeners used for this purpose such as organic or inorganic acids including mineral acids such as sulphuric acid or hydrochloric acid, or, the aryl sulphonic acids such as p-toluene or xylene sulphonic acids and mixtures thereof. The hardener can be used as an aqueous solution containing e.g. from 50–75% w/w of the acid.

The process can be operated in the presence of adjuvants such as viscosity modifiers, lubricants and agents for modifying the boiling point of the blowing agent such as glycol, methanol and methylene chloride. These adjuvants may be added either to the resin or to the blowing agent in significant quantities e.g. upto 20% w/w. The presence of some of these adjuvants can also improve the efficiency of the blowing agent employed.

The procedure used for producing foams such as e.g. phenolic foams with these blowing agents is no different from those used with conventional blowing agents. This has the advantage that existing processes using agents which have a high CFC content can be readily adapted to using blends of the present invention. Typically, the methods described in our published patent specifications EP-A-154452, EP-A-170357, EP-A-223489, EP-A-348199, and in U.S. Pat. No. 4,883,824 (Fibreglass Canada), U.S. Pat. No. 4,981,879 (Jim Walter Research Corp) and GB-A-2125055 (Koppers) and in Kunststoff-Handbuch, Vol. VII, Polyurethane, published by Carl Hauser-Verlag, Munich, 1966, can be used and these methods are incorporated herein by way of reference.

The present invention is further illustrated with reference to the following Examples. 1. Resin Preparation A phenolic resole was prepared in the conventional way. Aqueous formaldehyde (36.6%) (1.5 moles) was reacted with phenol (1 mole) using as a catalyst, aqueous sodium hydroxide (10N) (2.7% by weight of phenol charged).

The reaction mixture was heated to 60° C. over a 40 minute period and held at 60° C. for 30 minutes. The temperature was carefully increased to 80° C. and held for 30 minutes. The temperature was again increased to permit a 40 minute reflux period. Water was then vacuum distilled, monoethylene glycol (13%) added, to give a material with water content 9%. The resin was heated to 70° C. and held to give a material with a viscosity of 1800 cPs at 25° C. This resin was used in all the Examples and Comparative Tests except Examples 16 and 17 and Comparative Test 8 below.

2. Laboratory Foam Preparation

The phenolic resole previously described was conditioned to 23°–25° C. The cell stabilisers were added and dispersed. The blowing agent(s), pre-blended where more than one was used, were added and mechanically mixed to form an emulsion. The acid curing agent was then added to the emulsion, thoroughly mixed, and the mixture was poured into a paper mould, 22 cm×22cm×10 cm. The mould was transferred to an oven at 60° C. for 1 hour to allow the foam to rise and cure. The foam was cut 24 hours after manufacture and tested.

3. Semi-Scale Foam Preparation

Resin (containing cell stabilisers), blowing agent and acid curing agent were simultaneously fed to a mixing head. Dispensing was automatically stopped after approximately 1.6 kgs of the resultant mixture had been deposited into a closed metal mould— 65 cm×65 cm×7.5 cm—(lined with teflon-coated wooden inserts) which had been preheated for at least one hour in an oven at 60° C. The mould was returned to the oven for 1 hour and removed. The foam was de-moulded 24 hours later and cut for testing.

4. Thermal Conductivity (k-Value) Measurements

Thermal conductivity values (k-values) were measured using an Anacon 88 instrument at an average temperature of 23.85° C.—the hot plate temperature being 37.7° C. and the cold plate temperature 10° C.

Samples were stored at 23°–25° C. and ca. 50% relative humidity, unless otherwise stated.

In the tabulated data below the following abbreviations have been used.

Castor oil ethoxylate X=54 moles ethylene oxide per mole castor oil.

Castor oil alkoxylate Y=50 moles ethylene oxide and 15 moles of propylene oxide per mole of castor oil.

Castor oil ethoxylate Z=40 moles of ethylene oxide per mole of castor oil.

Acid=50% Sulphuric acid unless otherwise stated.

CFC 11=trichlorofluoromethane

CFC 113=trichlorotrifluoroethane.

5. Resin Preparation for Block Foams

A phenolic resole was prepared in the conventional way. Aqueous formaldehyde (36.6%) (1.5 moles) was reacted with phenol (1 mole) using as a catalyst aqueous sodium hydroxide (10N) (3.6% by weight of phenol charged).

The reaction mixture was heated to 60° C. over a 40 minute period and held at 60° C. for 30 minutes. The temperature was carefully increased to 80° C. and held for 30 minutes. The temperature was again increased to permit a 40 minute reflux period. Water was then vacuumed distilled, to give a material with a water content of 19%. The resin was then heated to 70° C., and held to give a material of 3700–4400 cPs viscosity. Diethylene glycol (4%) was then added, to give a resin of 2500–3000 cPs at 25° C. This resin was used in Examples 16 and 17 and in Comparative Test 8.

6. Semi-Scale Block Foam Preparation

Resin (containing cell stabilisers), blowing agent and acid curing agent were simultaneously fed into a mixing head. Dispensing was automatically stopped when approximately 6 kgs of the resulting mixture had been deposited into an open, teflon-lined, wooden mould—50 cm×50 cm×50 cm—which had been pre-heated for at least one hour in an oven at 60° C. The mould was returned to the oven for 24 hours, and removed. The foam was allowed to cool over 24 hours before being removed from the mould and cut for testing.

| | Formulations for laboratory foams made using HCFC-123 and Perfluoropentane | | | | | |
|---|---|---|---|---|---|---|
| Raw Materials | Example 1 | Example 2 | Example 3 | Example 4 | Comparative Test 1 | Comparative Test 2 |
| Resin | 100.0 | 100.0 | 100.0 | 100.0 | 100.0 | 100.0 |
| Surfactant X = 2.0 Y = 4.0 | 6.0 | 6.0 | 6.0 | 6.0 | 6.0 | 6.0 |
| HCFC-123 | 11.7 | 13.52 | 11.13 | 7.68 | 13.7 | 0.0 |
| Perfluoropentane | 2.9 | 0.28 | 4.89 | 11.52 | 0.0 | 0.0 |
| CFC-113 | 0.0 | 0.00 | 0.00 | 0.00 | 0.0 | 10.0 |
| CFC-11 | 0.0 | 0.00 | 0.00 | 0.00 | 0.0 | 5.0 |
| Acid curing agent | 17.5 | 17.5 | 17.5 | 17.5 | 17.5 | 17.5 |

| Foam Ref. No. | Dry Density (kg/m$^3$) | k-value (W/mK) |
|---|---|---|
| Example 1 | 50 | 0.0166 |
| Example 2 | 42 | 0.0200 |
| Example 3 | 50 | 0.0173 |
| Example 4 | 79 | 0.0188 |
| Comparative Test 1 | 39 | 0.0332 |
| Comparative Test 2 | 33 | 0.0278 |

| | Formulations for laboratory foams made using HCFC-141b and Perfluoropentane | | | | | |
|---|---|---|---|---|---|---|
| Raw Materials | Example 5 | Example 6 | Example 7 | Example 8 | Comparative Test 3 | Comparative Test 2 |
| Resin | 100.0 | 100.0 | 100.0 | 100.0 | 100.0 | 100.0 |
| Surfactant X = 2.0 Y = 4.0 | 6.0 | 6.0 | 6.0 | 6.0 | 6.0 | 6.0 |
| HCFC-141b | 9.3 | 10.2 | 8.9 | 6.5 | 10.5 | 0.0 |
| Perfluoropentane | 2.3 | 0.5 | 3.8 | 9.8 | 0.0 | 0.0 |
| CFC-113 | 0.0 | 0.0 | 0.0 | 0.0 | 0.0 | 10.0 |
| CFC-11 | 0.0 | 0.0 | 0.0 | 0.0 | 0.0 | 5.0 |
| Acid curing agent | 17.5 | 17.5 | 17.5 | 17.5 | 17.5 | 17.5 |

| Foam Ref. No. | Dry Density (kg/m³) | k-value (W/mK) |
| --- | --- | --- |
| Example 5 | 50 | 0.0174 |
| Example 6 | 45 | 0.0191 |
| Example 7 | 51 | 0.0176 |
| Example 8 | 78 | 0.0197 |
| Comparative Test 3 | 39 | 0.0350 |
| Comparative Test 2 | 33 | 0.0278 |

| Formulations for laboratory foams made using Pentane and Perfluoropentane | | |
| --- | --- | --- |
| Raw Materials | Example 9 | Comparative Test 4 |
| Resin | 100.0 | 100.0 |
| Surfactant | 12.0 | 12.0 |
| X = 4.0 | | |
| Y = 8.0 | | |
| Pentane | 8.9 | 7.4 |
| Perfluoropentane | 2.2 | 0.0 |
| Acid curing agent | 17.5 | 17.5 |

| Foam Ref. No. | Dry Density (kg/m³) | k-value (W/mK) |
| --- | --- | --- |
| Example 9 | 39 | 0.0186 |
| Comparative Test 4 | 45 | 0.0269 |

| Formulations for semi-scale foams made using HCFC-123 and Perfluoropentane | | | | |
| --- | --- | --- | --- | --- |
| Raw Materials | Example 10 | Example 11 | Example 12 | Comparative Test 5 | Comparative Test 6 |
| Resin | 100.00 | 100.00 | 100.00 | 100.00 | 100 |
| Surfactant | 6.00* | 6.00 | 6.00 | 6.0 | 6 |
| X = 2 | | | | | |
| Y = 4 | | | | | |
| HCFC-123 | 11.75 | 13.35 | 11.75 | 13.7 | 0 |
| Perfluoropentane | 2.95 | 0.70 | 0.00 | 0.0 | 0 |
| Perfluoroalkane Blend | 0.00 | 0.00 | 2.95 | 0.0 | 0 |
| CFC-113 | 0.00 | 0.00 | 0.00 | 0.0 | 10 |
| CFC-11 | 0.00 | 0.00 | 0.00 | 0.0 | 5 |
| Acid curing agent | 23.00 | 23.00 | 23.00 | 23.0 | 23 |

Notes
Perfluoroalkane blend comprising 70% by weight perfluoropentane, 20–30% perfluorohexane and 0–10% perfluoroheptane.
Acid = 55% Sulphuric acid.
*Surfactant used was Z = 2.0, Y = 4

| Foam Ref. No. | Dry Density (kg/m³) | Compressive Strength (kN/m²) | k-value (W/mK) |
| --- | --- | --- | --- |
| Example 10 | 47 | 194 | 0.0187 |
| Example 11 | 47 | 200 | 0.0240 |
| Example 12 | 46 | 170 | 0.0200 |
| Comparative Test 5 | 45 | 170 | 0.0330 |
| Comparative Test 6 | 44 | 198 | 0.0240 |

Notes
Thermal conductivity values are those measured after storing samples at 60° C. for 180 days showing excellent storage stability of the foam.

Formulations for foams made using
HCFC-141b and Perfluoropentane

| Raw Materials | Example 13 | Example 14 | Example 15 | Comparative Test 7 | Comparative Test 6 |
|---|---|---|---|---|---|
| Resin | 100.00 | 100.00 | 100.00 | 100.00 | 100 |
| Surfactant X = 2.0 Y = 4.0 | 6.0 | 6.0 | 6.0 | 6.0 | 6 |
| HCFC-141b | 9.5 | 10.3 | 9.5 | 10.5 | 0 |
| Perfluoropentane | 2.4 | 0.5 | 0.0 | 0.0 | 0 |
| Perfluoroalkane Blend | 0.0 | 0.0 | 2.4 | 0.0 | 0 |
| CFC-113 | 0.0 | 0.0 | 0.0 | 0.0 | 10 |
| CFC-11 | 0.0 | 0.0 | 0.0 | 0.0 | 5 |
| Acid curing agent | 23.0 | 23.0 | 23.0 | 23.0 | 23 |

Notes
Perfluoroalkane blend comprising 70% by weight Perfluoropentane, 20–30% Perfluorohexane and 0–10% Perfluoroheptane.
Acid = 55% Sulphuric acid.

| Foam Ref. No. | Dry Density (kg/m³) | Compressive Strength (kN/m²) | k-value (W/mK) |
|---|---|---|---|
| Example 13 | 45 | 188 | 0.0190 |
| Example 14 | 41 | 170 | 0.0200 |
| Example 15 | 47 | 171 | 0.0195 |
| Comparative Test 7 | 42 | 150 | 0.0330 |
| Comparative Test 6 | 44 | 198 | 0.0240 |

Notes
Thermal conductivity values are those measured after storing samples at 60° C. for 180 days showing excellent storage stability of the foam.

Formulations for semi-scale block foams using
HCFC-141b and HCFC-123 and perfluoropentane

| Raw Materials | Example 16 | Example 17 | Comparative Test 8 |
|---|---|---|---|
| Resin | 100.0 | 100.0 | 100.00 |
| Surfactant X = 4.0 Y = 4.0 | 8.0 | 8.0 | 8.00 |
| HCFC-141b | 7.2 | 0.0 | 0.00 |
| HCFC-123 | 0.0 | 8.8 | 0.00 |
| Perfluoropentane | 1.8 | 2.2 | 0.00 |
| CFC-113 | 0.0 | 0.0 | 7.50 |
| CFC-11 | 0.0 | 0.0 | 3.75 |
| Acid curing agent | 16.0 | 16.0 | 16.00 |

Notes
Acid = 10:6 blend of 50% Sulphuric acid and 85% Orthophosphoric acid.

| Foam Ref. No. | Dry Density (kg/m³) | Compressive Strength (kN/m²) | k-value (W/mK) |
|---|---|---|---|
| Example 16 | 46 | 187 | 0.0178 |
| Example 17 | 42 | 202 | 0.0187 |
| Comparative Test 8 | 38 | 165 | 0.0160 |

Notes
Thermal conductivity values are those measured after storing samples at 60° C. for 28 days to illustrate storage stability.

Solubility of blowing agents in phenolic resin

| Blowing Agent | Solubility at 20° C. (wt %) | Solubility in resin with surfactants at 20° C. (wt %) |
|---|---|---|
| CFC-113 | 1.0 | |
| CFC-11 | 1.5 | |
| 2:1 CFC-113/ CFC-11 | 1.2 | 3.1 |
| HCFC-141b | 3.9 | 7.6 |
| HCFC-123 | 2.8 | 8.0 |
| Perfluoropentane | not detected | |

We claim:
1. A process for producing a phenolic foam in the presence of a blowing agent composition, said blowing agent composition comprising a blend of:
(A) at least one flurocarbon component having the general formula:

$$C_nH_xF_y \qquad (I)$$

wherein x=0, or a whole number from 2 to n/2, such that:
  (a) for a cyclic fluorocarbon:
    when x=0, n=3 to 10 and y=2n, and
    when x=a whole number from 2 to n/2,
      n=4 or higher, and
      y=2n−x,
      whereby x+y=2n; and
  (b) for an open chain fluorcarbon:
    when x=0, n=2 to 10 and y=2n+2,
    when x=a whole number from 2 to n/2,
      n=4 or higher,
      y=(2n+2)−x; and
(B) at least one other component selected from:
  (a) a hydrogenated chlorofluorocarbon (hereafter ("HCFC"),
  (b) a hydrogenated fluorocarbon hereafter (HFC") having the general formula:

$$C_rH_pF_q \qquad (II)$$

wherein:
  r=1 to 3,
  p=1 to 4, and
  q=(2r+2)−p for an open-chain HFC, and
  q=2r−p for a cyclic HFC, such that:

p+q=2r+2 for an open chain HFC, and p+q=2r for a cyclic HFC; and (c) an alkane or cycloalkane having a boiling point below 120° C.

2. The process as claimed in claim 1 wherein said phenolic foams have a thermal conductivity value (k) below 0.025 W/m.K.

3. The process as claimed in claim 1 wherein said fluorocarbon component is selected from the group consisting of perfluoro(cyclo)alkanes in which all hydrogen atoms in the (cyclo)alkane have been replaced by fluorine atoms, and partially fluorinated $C_4$ and higher (cyclo)alkanes in which the number of hydrogen atoms is not greater than half the number of carbon atoms in the fluoro(cyclo)alkane as represented by formula (I).

4. The process as claimed in claim 1 wherein said fluorocarbon component is a fluorinated $C_4$-$C_8$ (cyclo)alkane in which the number of hydrogen atoms is two or less for the $C_4$ (cyclo)alkanes and, correspondingly, four or less for the $C_8$ (cyclo)alkanes.

5. The process as claimed in claim 1 wherein said fluorocarbon component is selected from the group consisting of perfloropentane, perfluorohexane and perfluoroheptane.

6. The process as claimed in any one of the preceding claims wherein said at least one other component is a HCFC selected from the group consisting of:

HCFC 123 which can be represented by $CF_3$—$CHCl_2$,

HCFC 141b which can be represented by $CCl_2F$—$CH_3$,

HCFC 124 which can be represented by $CHClF_2$,

HCFC 142b which can be represented by $CH_3CClF_2$,

HFC 225ca which can be represented by $CHCl_2$—$CF_2$—$CF_3$, and

HCFC 225cb which can be represented by $CClF_2$—$CF_2$—$CFClF$.

7. The process claimed in claim 1 wherein said at least one other component is a HFC selected from the group consisting of:

HFC 125 which can be represented by $CHF_2$—$CF_3$,

HFC 134a which can be represented by $CF_3$—$CH_2F$, and

HFC 152a which can be represented by $CH_3$—$CHF_2$.

8. The process as claimed in claim 1 wherein said at least one other component is n-pentane.

9. The process as claimed in claim 1 wherein said at least one other component is cyclopentane.

* * * * *

UNITED STATES PATENT AND TRADEMARK OFFICE
CERTIFICATE OF CORRECTION

PATENT NO. : 5,489,619
DATED : February 6, 1996
INVENTOR(S) : MICHAEL A. BARCROFT, KATHRYN S. GOULD, DAVID R. JOHNSTONE and DAVID C. WILSON It is certified that error appears in the above-indentified patent and that said Letters Patent is hereby corrected as shown below:

Col. 4, l. 5, "1. Resin Preparation" should be on a separate line as a heading

Claim 5, col. 11, line 26, correct the spelling of the word "perfluoropentane,"

Claim 6, col. 12, line 13, correct the formula to read "$CF_2\text{--}CHClF$."

Signed and Sealed this

Third Day of September, 1996

Attest:

BRUCE LEHMAN

Attesting Officer

Commissioner of Patents and Trademarks